US012679039B2

(12) United States Patent
Kawajiri

(10) Patent No.: US 12,679,039 B2
(45) Date of Patent: Jul. 14, 2026

(54) THREE-DIMENSIONAL LAMINATE SHAPING DEVICE

(71) Applicant: FUJI CORPORATION, Chiryu (JP)

(72) Inventor: Akihiro Kawajiri, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 50 days.

(21) Appl. No.: 18/714,301

(22) PCT Filed: Dec. 15, 2021

(86) PCT No.: PCT/JP2021/046275
§ 371 (c)(1),
(2) Date: May 29, 2024

(87) PCT Pub. No.: WO2023/112205
PCT Pub. Date: Jun. 22, 2023

(65) Prior Publication Data
US 2025/0340019 A1     Nov. 6, 2025

(51) Int. Cl.
| | |
|---|---|
| *B29C 64/393* | (2017.01) |
| *B29C 64/209* | (2017.01) |
| *B33Y 30/00* | (2015.01) |
| *B33Y 50/02* | (2015.01) |
| *B33Y 80/00* | (2015.01) |
| *B29L 31/34* | (2006.01) |

(52) U.S. Cl.
CPC .......... *B29C 64/393* (2017.08); *B29C 64/209* (2017.08); *B33Y 30/00* (2014.12); *B33Y 50/02* (2014.12); *B33Y 80/00* (2014.12); *B29L 2031/3425* (2013.01)

(58) Field of Classification Search
None
See application file for complete search history.

(56) References Cited

U.S. PATENT DOCUMENTS

| | | | | |
|---|---|---|---|---|
| 8,163,224 B2 * | 4/2012 | Higashi | ................ | B29C 64/153 |
| | | | | 356/388 |
| 8,571,845 B2 * | 10/2013 | Cao | ....................... | G06F 30/398 |
| | | | | 703/13 |
| 2005/0229737 A1 * | 10/2005 | Tsuno | ................... | B29C 65/006 |
| | | | | 74/490.09 |

(Continued)

FOREIGN PATENT DOCUMENTS

| | | |
|---|---|---|
| JP | 2001-44601 A | 2/2001 |
| JP | 2017-165093 A | 9/2017 |
| WO | WO-2020/250416 A1 | 12/2020 |

OTHER PUBLICATIONS

International Search Report mailed on Feb. 15, 2022 in PCT/JP2021/046275 filed on Dec. 15, 2021 (citing references 1 & 15 therein, 2 pages).

*Primary Examiner* — Yung-Sheng M Tsui
*Assistant Examiner* — Melody Tsui
(74) *Attorney, Agent, or Firm* — Oblon, McClelland, Maier & Neustadt, L.L.P.

(57) ABSTRACT

A three-dimensional laminate shaping device includes calibration jig in which multiple types of calibration marks are provided on the same surface. In this way, in three-dimensional laminate shaping device, using calibration jig in which multiple types of calibration marks are provided on the same surface makes it possible to perform multiple types of calibration with one jig.

9 Claims, 4 Drawing Sheets

(56) References Cited

U.S. PATENT DOCUMENTS

| | | | |
|---|---|---|---|
| 2007/0248892 A1* | 10/2007 | Rangelow | G03F 9/7042 |
| | | | 430/30 |
| 2012/0303151 A1* | 11/2012 | Ye | G05B 13/04 |
| | | | 700/119 |
| 2014/0039658 A1* | 2/2014 | Bangera | A61B 17/3403 |
| | | | 700/98 |
| 2016/0221230 A1* | 8/2016 | Mita | G03F 7/0002 |
| 2016/0231648 A1* | 8/2016 | Hirano | G03F 7/00 |
| 2016/0236279 A1* | 8/2016 | Ashton | B29C 64/153 |
| 2016/0325562 A1* | 11/2016 | Mulkens | B41J 13/14 |
| 2016/0339644 A1* | 11/2016 | Sobue | G03G 15/224 |
| 2018/0001568 A1* | 1/2018 | Sanchez Ribes | B33Y 30/00 |
| 2018/0261472 A1* | 9/2018 | Miyazaki | H01L 21/6715 |
| 2018/0370148 A1 | 12/2018 | Sekine et al. | |
| 2019/0091934 A1 | 3/2019 | Cooper | |
| 2019/0230248 A1 | 7/2019 | Mizes et al. | |
| 2020/0089185 A1* | 3/2020 | Shapiro | B23K 10/006 |
| 2020/0164588 A1* | 5/2020 | Vaes | B29C 64/153 |
| 2024/0059020 A1* | 2/2024 | Milshtein | B22F 12/63 |

* cited by examiner

THREE-DIMENSIONAL LAMINATE SHAPING DEVICE

TECHNICAL FIELD

The present disclosure relates to a technique for calibration performed when three-dimensional printing is performed by ejecting ink from an ejection head.

BACKGROUND ART

Patent Literature 1 discloses a wiring pattern forming device for a printed circuit board in which a test pattern is formed on a test piece placed in an inspection area by an inkjet head, the test pattern is imaged by a CCD camera provided in a head portion, a landing position is recognized based on an image obtained from the CCD camera, and ejection timing of ink ejected from nozzles of the inkjet head is corrected.

PATENT LITERATURE

Patent Literature 1: JP-A-2001-44601

BRIEF SUMMARY

Technical Problem

However, a main object of the device disclosed in Patent Literature 1 is to correct the ejection timing of the ink ejected from the nozzles of the inkjet head, and Patent Literature 1 does not disclose other types of calibration. When multiple types of calibration are performed inside one device, conventionally, a test pattern corresponding to contents of each calibration is formed in a different region for each process performed after each calibration, and calibration is performed based on the test pattern.

An object of the present disclosure is to provide a technique capable of performing multiple types of calibration with one jig.

Solution to Problem

In order to achieve the above-described object, a three-dimensional laminate shaping device of the present disclosure includes a plate-shaped jig in which multiple types of calibration marks are provided on the same surface.

Advantageous Effects

According to the present disclosure, it is possible to perform multiple types of calibration with one jig.

DESCRIPTION OF EMBODIMENTS

Hereinafter, embodiments of the present disclosure will be described in detail with reference to the drawings.

Figure 1:
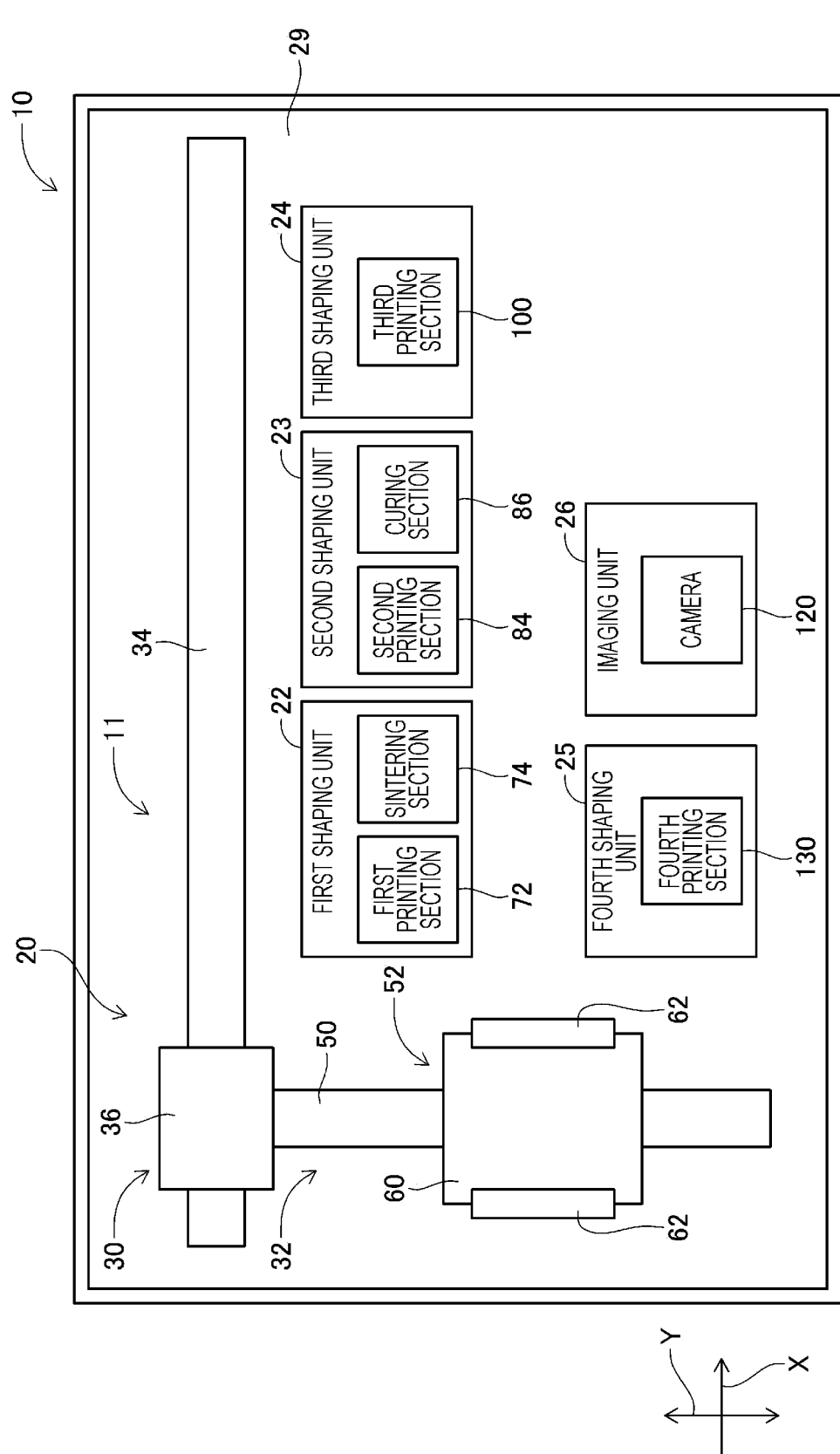
FIG. 1 is a view illustrating a schematic configuration of a three-dimensional laminate shaping device according to an embodiment of the present disclosure.

FIG. 1 illustrates a schematic configuration of three-dimensional laminate shaping device 10 according to an embodiment of the present disclosure. Three-dimensional laminate shaping device 10 includes conveyance device 20, first shaping unit 22, second shaping unit 23, third shaping unit 24, fourth shaping unit 25, imaging unit 26, and control device 28 (refer to FIG. 2). Conveyance device 20, first shaping unit 22, second shaping unit 23, third shaping unit 24, fourth shaping unit 25, and imaging unit 26 are disposed on base 29 of three-dimensional laminate shaping device 10. Base 29 has a generally rectangular shape, and in the following description, a longer direction of base 29 will be referred to as an X-axis direction, a shorter direction of base 29 will be referred to as a Y-axis direction, and a direction orthogonal to both the X-axis direction and the Y-axis direction will be referred to as a Z-axis direction. The Z-axis direction is the same as a vertical direction.

Conveyance device 20 includes X-axis slide mechanism 30 and Y-axis slide mechanism 32. X-axis slide mechanism 30 includes X-axis slide rail 34 and X-axis slider 36. X-axis slide rail 34 is disposed on base 29 to extend in the X-axis direction. X-axis slider 36 is held by X-axis slide rail 34 to be slidable in the X-axis direction. Furthermore, X-axis slide mechanism 30 includes electromagnetic motor 38 (refer to FIG. 2), and X-axis slider 36 is moved to any position in the X-axis direction by driving electromagnetic motor 38. In addition, Y-axis slide mechanism 32 includes Y-axis slide rail 50 and table 52. Y-axis slide rail 50 is disposed on base 29 to extend in the Y-axis direction, and is movable in the X-axis direction. One end portion of Y-axis slide rail 50 is coupled to X-axis slider 36. Table 52 is held in Y-axis slide rail 50 to be slidable in the Y-axis direction. Furthermore, Y-axis slide mechanism 32 includes electromagnetic motor 56 (refer to FIG. 2), and table 52 is moved to any position in the Y-axis direction by driving electromagnetic motor 56. In this manner, table 52 is moved to any position on base 29 by driving X-axis slide mechanism 30 and Y-axis slide mechanism 32.

Figure 2:
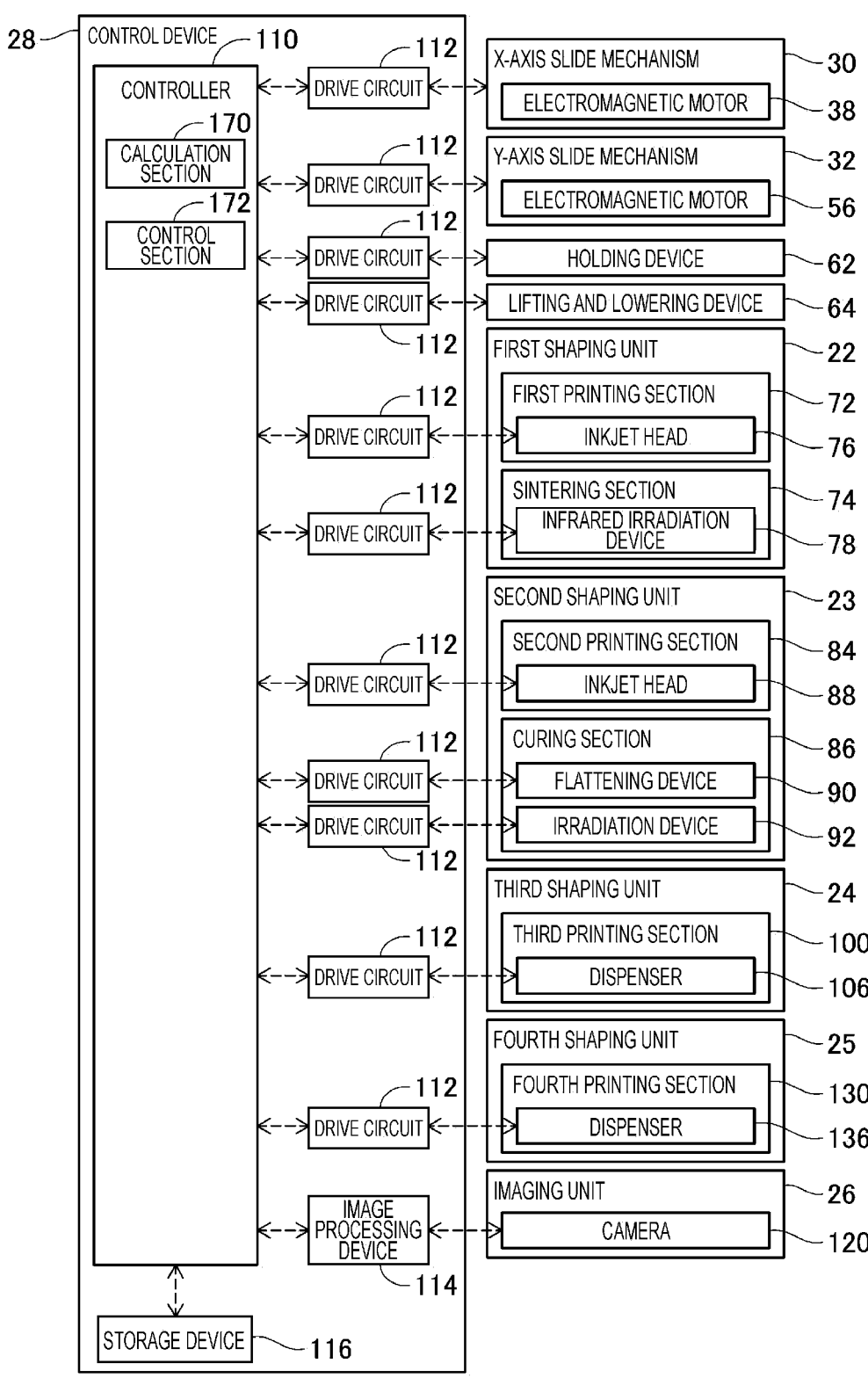
FIG. 2 is a block diagram illustrating a control device of the three-dimensional laminate shaping device in FIG. 1.

Table 52 includes base plate 60, holding device 62, and lifting and lowering device 64 (refer to FIG. 2). Base plate 60 is formed in a flat plate shape, and a board (not illustrated) is placed on an upper surface thereof. Holding devices 62 are provided on both side portions of base plate 60 in the X-axis direction. Both edge portions in the X-axis direction of the board placed on base plate 60 are gripped by holding devices 62, and thus, the board is fixedly held. In addition, lifting and lowering device 64 is disposed below base plate 60, and lifts and lowers base plate 60.

First shaping unit 22 shapes wiring of a circuit board, and includes first printing section 72 and sintering section 74. First printing section 72 includes inkjet head 76 (refer to FIG. 2), and inkjet head 76 linearly ejects metal ink. The metal ink is obtained by dispersing nanometer-sized metal, for example, silver fine particles in a solvent. Surfaces of the metal fine particles are coated with a dispersant, and aggregation in the solvent is prevented. In addition, for example, inkjet head 76 ejects the metal ink from multiple nozzles (not illustrated) by a piezo method using a piezoelectric element.

Sintering section 74 includes infrared irradiation device 78 (refer to FIG. 2). Infrared irradiation device 78 irradiates the ejected metal ink with infrared light, and the metal ink irradiated with infrared light is sintered to form the wiring. Sintering of the metal ink is a phenomenon in which conductivity is increased as follows. Evaporation of a solvent or decomposition of a protective film of the metal fine particles, that is, a dispersant is performed by applying energy, and the metal fine particles are brought into contact with each other or fused together. The metal ink is sintered to form metal wiring.

In addition, second shaping unit 23 shapes a resin layer of a circuit board, and includes second printing section 84 and curing section 86. Second printing section 84 includes inkjet head 88 (refer to FIG. 2), and inkjet head 88 ejects an ultraviolet curing resin. The ultraviolet curing resin is cured by irradiation with ultraviolet light. For example, inkjet head 88 may be a piezo type inkjet head using a piezoelectric element, or may be a thermal type inkjet head in which a resin is ejected from multiple nozzles (not illustrated) after being heated to generate air bubbles.

Curing section 86 includes flattening device 90 (refer to FIG. 2) and irradiation device 92 (refer to FIG. 2). Flattening device 90 flattens an upper surface of the ultraviolet curing resin ejected by inkjet head 88. For example, while a surface of the ultraviolet curing resin is levelled, an excess resin is scraped out by a roller or a blade. In this manner, a thickness of the ultraviolet curing resin is uniformized. In addition, irradiation device 92 includes a mercury lamp or an LED as a light source, and irradiates the ejected ultraviolet curing resin with ultraviolet light. In this manner, the ejected ultraviolet curing resin is cured to form a resin layer.

Third shaping unit 24 shapes a connection portion between an electrode of an electronic component and wiring on the circuit board, and includes third printing section 100. Third printing section 100 includes dispenser 106 (refer to FIG. 2), and dispenser 106 ejects conductive paste. The conductive paste is obtained in such a manner that microm-eter-sized metal particles are dispersed into the resin cured by heating at a relatively low temperature. The metal par-ticles have a flake shape, and viscosity of the conductive paste is relatively higher than that of the metal ink. The amount of the conductive paste ejected from dispenser 106 is controlled by an inner diameter of a needle, a pressure during discharge, and an ejection time.

The conductive paste ejected from dispenser 106 is heated by a heater (not illustrated) incorporated in base plate 60, and the resin is cured in the heated conductive paste. In this case, in the conductive paste, the resin is cured and con-tracted, and the dispersed flake-shaped metal particles come into contact with the resin. In this manner, the conductive paste exhibits conductivity. In addition, the resin of the conductive paste is an organic adhesive, and exhibits an adhesive force when cured by heating.

Fourth shaping unit 25 shapes a resin for fixing the electronic component to the circuit board, and includes fourth printing section 130. Fourth printing section 130 includes dispenser 136 (refer to FIG. 2), and dispenser 136 ejects a thermosetting resin. The thermosetting resin is cured by heating. For example, dispenser 136 is a piezo type using a piezoelectric element. The thermosetting resin ejected from dispenser 136 is heated by a heater incorporated in base plate 60, and is cured thereafter.

Imaging unit 26 images a board placed on base plate 60 of table 52, and includes camera 120. Camera 120 is disposed above base 29 in a downward facing posture, and images an upper surface of the board placed on base plate 60 of table 52 from above.

As illustrated in FIG. 2, control device 28 includes controller 110, multiple drive circuits 112, image processing device 114, and storage device 116. Multiple drive circuits 112 are connected to electromagnetic motors 38 and 56, holding device 62, lifting and lowering device 64, inkjet head 76, infrared irradiation device 78, inkjet head 88, flattening device 90, irradiation device 92, and dispensers 106 and 136. Controller 110 includes CPU, ROM, and RAM, is a computer as a main body, and is connected to multiple drive circuits 112. In this manner, operations of conveyance device 20, first shaping unit 22, second shaping unit 23, third shaping unit 24, fourth shaping unit 25, and imaging unit 26 are controlled by controller 110. In addition, controller 110 is connected to image processing device 114. Image processing device 114 processes imaging data obtained by camera 120, and controller 110 acquires various information from the imaging data. In addition, storage device 116 stores various information calculated based on the imaging data.

In three-dimensional laminate shaping device 10, with the above-described configuration, a resin laminate body is formed on the board placed on base plate 60 of table 52, and wiring is formed on an upper surface of the resin laminate body to form a circuit board.

Figure 3:
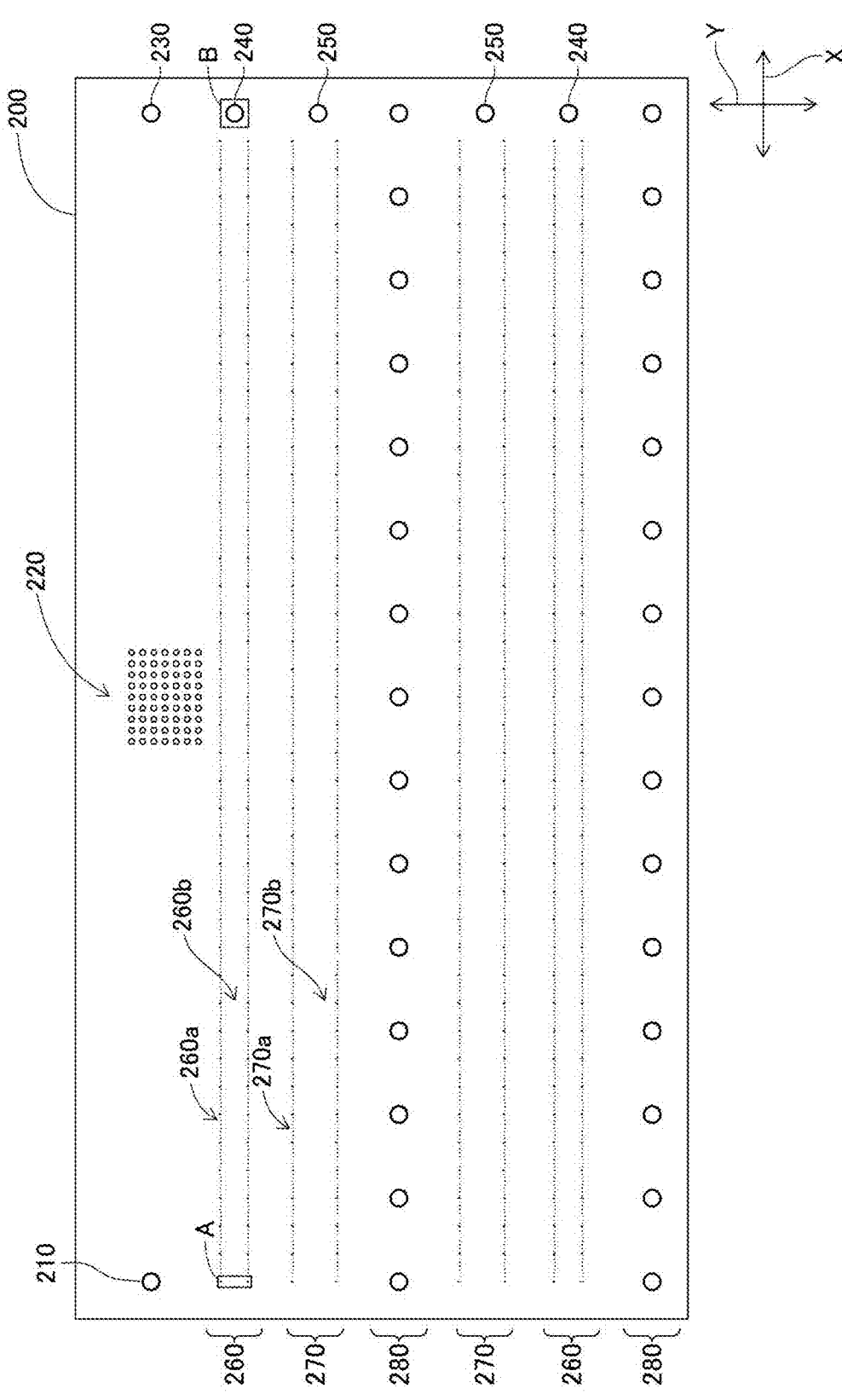
FIG. 3 is a view illustrating an example of a calibration jig provided in the three-dimensional laminate shaping device in FIG. 1.

FIG. 3 is a plan view of calibration jig 200 used when three-dimensional laminate shaping device 10 performs various calibration. In the present embodiment, for example, calibration jig 200 is formed of a rectangular glass plate having a size of 35 mm×75 mm, and is fixed at a predeter-mined position on base plate 60, at least a position that does not interfere with placement of the board.

Camera tilt calibration mark 210, camera calibration mark 220, jig tilt calibration mark 230, conductive paste position calibration mark 240, and thermosetting resin position cali-bration mark 250 are printed on a front surface of calibration jig 200. In addition, three types of first to third calibration regions 260, 270, and 280 are provided on the front surface of calibration jig 200. First calibration region 260 includes ultraviolet curing resin position calibration mark 260a for aligning a position of the ultraviolet curing resin ejected from the nozzles of inkjet head 88, and abnormal nozzle detection region 260b for detecting an abnormal nozzle from the multiple nozzles of inkjet head 88. Second calibration region 270 includes metal ink position calibration mark 270a for aligning a position of the metal ink ejected from the nozzles of inkjet head 76, and abnormal nozzle detection region 270b for detecting an abnormal nozzle from the multiple nozzles of inkjet head 76. In third calibration region 280, conductive paste position calibration mark 240 and thermosetting resin position calibration mark 250 are printed multiple times.

Calibration jig 200 is fixed as described above. Therefore, printing positions (for example, positions indicated by XY-coordinates) of various calibration marks 210, 220, 230, 240, 250, 260a, and 270a have known fixed values, and are stored in storage device 116.

When tilt of camera 120 is adjusted using camera tilt calibration mark 210, controller 110 moves camera 120 to a printing position of camera tilt measurement mark 210, and thereafter, instructs camera 120 to image a region on cali-bration jig 200 including the printing position. Controller 110 performs image recognition on the imaging data acquired from camera 120 to acquire a deviation between a position of camera tilt calibration mark 210 actually imaged within the imaging data and a position to be originally imaged, and adjusts the tilt of camera 120 to eliminate the acquired deviation. In this manner, calibration of the tilt of camera 120 is completed.

Camera calibration mark 220 includes multiple dots. When calibration of camera 120 is performed, controller 110 moves camera 120 to a printing position of camera calibra-tion mark 220, and thereafter, instructs camera 120 to image camera calibration mark 220. Controller 110 performs image recognition on the imaging data acquired from camera 120 to estimate various parameters of camera 120, specifically, a lens distortion parameter, an internal parameter, and an external parameter, and stores the estimated various parameters in storage device 116. In this manner, calibration of camera 120 is completed. When performing various controls actually using the imaging data acquired from camera 120, controller 110 uses the imaging data corrected based on various parameters stored in storage device 116.

In the present embodiment, calibration jig 200 is fixed at a predetermined position on base plate 60. Base plate 60 moves in the X-axis direction or in the Y-axis direction together with table 52. Therefore, in some cases, an installation position of calibration jig 200 may deviate from an original installation position due to a movement operation thereof. Jig tilt calibration mark 230 is used to measure this positional deviation. When the positional deviation of calibration jig 200 is measured using jig tilt calibration mark 230, controller 110 moves dispenser 106 to the printing position of jig tilt calibration mark 230, and thereafter, instructs dispenser 106 to eject the conductive paste toward jig tilt calibration mark 230. When dispenser 106 applies the conductive paste to the vicinity including the inside of jig tilt calibration mark 230 in response to this instruction, controller 110 instructs camera 120 to image the vicinity of jig tilt calibration mark 230. Controller 110 performs image recognition on the imaging data acquired from camera 120. For example, when a position to which the conductive paste is originally applied is the center of jig tilt calibration mark 230 and an actually applied position is deviated from the center, controller 110 measures a deviation amount thereof, and stores the measured deviation amount in storage device 116. In this manner, jig tilt calibration is completed. When performing second calibration other than the jig tilt calibration using calibration jig 200, controller 110 performs second calibration in view of the measured deviation amount.

Figure 4:
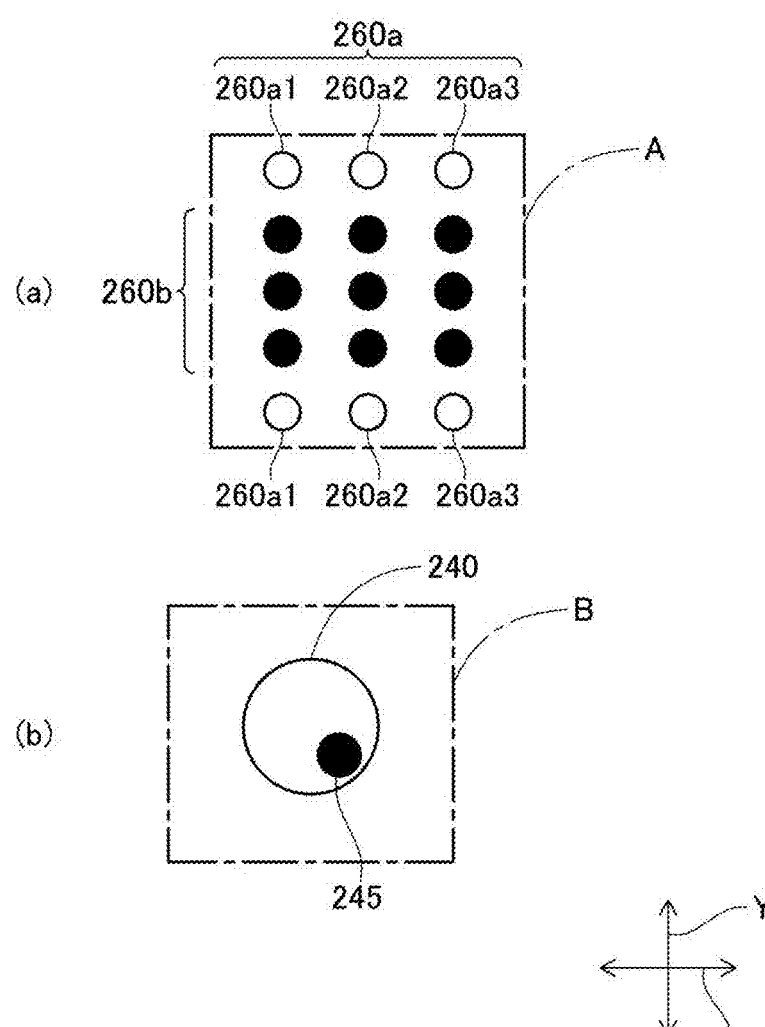
FIG. 4 is an enlarged view of a partial region of the calibration jig in FIG. 3.

Conductive paste position calibration mark 240 is used to align an application position of the conductive paste ejected by dispenser 106. FIG. 4(*b*) is an enlarged view of the vicinity of conductive paste position calibration mark 240 to which conductive paste 245 is applied, and is an enlarged view of region B in FIG. 3. When the application position of the conductive paste is aligned, as when the positional deviation of calibration jig 200 is measured using jig tilt calibration mark 230, controller 110 moves dispenser 106 to the printing position of conductive paste position calibration mark 240, and thereafter, instructs dispenser 106 to eject the conductive paste toward conductive paste position calibration mark 240. In response to this instruction, dispenser 106 applies the conductive paste to the vicinity including the inside of conductive paste position calibration mark 240. FIG. 4(*b*) illustrates an example of this state. Controller 110 instructs camera 120 to image the vicinity of conductive paste position calibration mark 240. When the imaging data is acquired from camera 120 in response to this instruction, controller 110 measures the deviation amount of the application position of the conductive paste by performing image recognition on the imaging data, and stores the measured deviation amount in storage device 116. In this manner, conductive paste position calibration is completed. When discharging the conductive paste from dispenser 106, controller 110 corrects the measured deviation amount, and thereafter, ejects the conductive paste.

Thermosetting resin position calibration mark 250 is used to align the application position of the thermosetting resin ejected by dispenser 136. A method for aligning the application position of the thermosetting resin using thermosetting resin position calibration mark 250 is the same as the method for aligning the application position of the conductive paste using conductive paste position calibration mark 240, and thus, the description thereof will be omitted.

In first calibration region 260, calibration is performed on inkjet head 88. Inkjet head 88 includes multiple nozzles as described above, and the number of the nozzles is 128, for example. When the ultraviolet curing resin ejected from each nozzle is aligned, printing is not performed as intended by an operator. Therefore, the alignment is performed using ultraviolet curing resin position calibration mark 260*a*. More specifically, controller 110 moves inkjet head 88 such that the respective nozzles of inkjet head 88 correspond to respective marks 260*a*1, 260*a*2, 260*a*3, and so on (refer to FIG. 4(*a*)) of ultraviolet curing resin position calibration mark 260*a*. Controller 110 instructs inkjet head 88 to eject the ultraviolet curing resin from the respective nozzles.

FIG. 4(*a*) is a partially enlarged view of first calibration region 260 in which the ultraviolet curing resin is applied to abnormal nozzle detection region 260*b*, and is an enlarged view of region A in FIG. 3. FIG. 4(*a*) illustrates the ultraviolet curing resin to which a dot "." is applied. When the ultraviolet curing resin is aligned, controller 110 instructs camera 120 to image first calibration region 260 to which the ultraviolet curing resin is applied. When the imaging data is acquired from camera 120 in response to this instruction, controller 110 measures the deviation amount of the application position of the ultraviolet curing resin by performing image recognition on the imaging data. In FIG. 4(*a*), for example, three dots "•" are applied between two marks 260*a*1 and 260*a*1 located up and down in the Y-axis direction. In the illustrated example, a center position of two marks 260*a*1 and 260*a*1 in the Y-axis direction coincides with a center position of the three dots "." therebetween in the Y-axis direction. Therefore, the deviation amount is "0". However, the center positions of two marks 260*a*1 and 260*a*1 in the Y-axis direction actually deviates from the center positions of the three dots "•" therebetween in the Y-axis direction. Therefore, controller 110 can measure the deviation amount, and store the measured deviation amount in storage device 116. In this manner, ultraviolet curing resin position calibration is completed.

In addition, whether the corresponding nozzle of inkjet head 88 is normal or abnormal can be determined based on whether the ultraviolet curing resin is ejected onto abnormal nozzle detection region 260*b*. Therefore, controller 110 determines whether a dot to which the ultraviolet curing resin is not applied is present within the imaging data acquired from camera 120. When detecting that the dot to which the ultraviolet curing resin is not applied is present, controller 110 determines that the nozzle corresponding to a detection position thereof is abnormal, and stores information specifying the nozzle in storage device 116. In this manner, calibration of inkjet head 88 which is performed using first calibration region 260 is completed.

When controller 110 causes inkjet head 88 to eject the ultraviolet curing resin, controller 110 corrects the measured deviation amount, and thereafter, causes inkjet head 88 to eject the ultraviolet curing resin. In addition, controller 110 does not cause the nozzle determined to be abnormal to eject the ultraviolet curing resin, causes the second nozzle to eject the ultraviolet curing resin as much as a reduced amount, and uniformly applies the ultraviolet curing resin onto the board.

In second calibration region 270, calibration is performed on inkjet head 76. A method for performing calibration on inkjet head 76 using second calibration region 270 is the same as the method for performing calibration on inkjet head 88 using first calibration region 260, and thus, description thereof will be omitted.

As described above, in third calibration region 280, conductive paste position calibration marks 240 and thermosetting resin position calibration marks 250 are printed multiple times. When calibration is performed using conductive paste position calibration mark 240 and thermosetting resin position calibration mark 250, the conductive paste and the thermosetting resin are applied to the vicinity of conductive paste position calibration mark 240 and thermosetting resin position calibration mark 250. Therefore, the same calibration cannot be performed again using same conductive paste position calibration mark 240 and thermosetting resin position calibration mark 250. Therefore, when the same calibration is performed again, it is necessary to use second conductive paste position calibration mark 240 and second thermosetting resin position calibration mark 250. Therefore, multiple conductive paste position calibration marks 240 and multiple thermosetting resin position calibration marks 250 are preliminarily provided in calibration jig 200.

Similarly, two first calibration regions 260 and two second calibration regions 270 are provided on calibration jig 200, and furthermore, two third calibration regions 280 are also provided.

As described above, three-dimensional laminate shaping device 10 of the present embodiment includes calibration jig 200 in which multiple types of calibration marks are provided on the same surface.

In this way, in three-dimensional laminate shaping device 10 of the present embodiment, using calibration jig 200 in which multiple types of calibration marks are provided on the same surface makes it possible to perform multiple types of calibration with one jig. Therefore, multiple types of calibration can be performed while an installation space can be saved at low cost. In addition, multiple types of calibration marks are disposed on the same surface. Therefore, it is not necessary to perform height alignment for each calibration, and efficiency is improved. Furthermore, calibration jig 200 is installed inside three-dimensional laminate shaping device 10. Therefore, calibration can be performed at a timing at which calibration is needed. In the present embodiment, calibration jig 200 is an example of a "plate-shaped jig".

In addition, three-dimensional laminate shaping device 10 includes second printing section 84 including inkjet head 88 for discharging the ultraviolet curing resin, and performing printing in such a manner that the ultraviolet curing resin is laminated on the board by discharging the ultraviolet curing resin from inkjet head 88. Multiple types of calibration marks include a first aligning mark for aligning a printing position when second printing section 84 prints the ultraviolet curing resin. The ultraviolet curing resin is an example of a "structural material". Inkjet head 88 is an example of a "first ejection head". Second printing section 84 is an example of a "first printing device". Ultraviolet curing resin position calibration mark 260a is an example of a "first aligning mark".

Three-dimensional laminate shaping device 10 includes first printing section 72 including inkjet head 76 for discharging the metal ink, and performing printing in such a manner that a circuit material is printed on the board by discharging the metal ink from inkjet head 76, and the multiple types of calibration marks include metal ink position calibration mark 270a for aligning the printing position when first printing section 72 prints the circuit material.

Inkjet head 76 is an example of a "second ejection head". First printing section 72 is an example of a "second printing device". Metal ink position calibration mark 270a is an example of a "second aligning mark".

In addition, three-dimensional laminate shaping device 10 includes dispenser 106 that supplies conductive paste 245 onto the board, and the multiple types of calibration marks include conductive paste position calibration mark 240 for aligning a supply position when dispenser 106 supplies conductive paste 245 onto the board. Conductive paste 245 is an example of a "conductive adhesive". Dispenser 106 is an example of a "first supply device". Conductive paste position calibration mark 240 is an example of a "third aligning mark".

Three-dimensional laminate shaping device 10 includes dispenser 136 that supplies the thermosetting resin onto the board, and the multiple types of calibration marks include thermosetting resin position calibration mark 250 for aligning the supply position when dispenser 136 supplies the thermosetting resin onto the board. The thermosetting resin is an example of a "non-conductive adhesive". Dispenser 136 is an example of a "second supply device". Thermosetting resin position calibration mark 250 is an example of a "fourth aligning mark".

In addition, inkjet head 88 includes multiple nozzles, and calibration jig 200 includes abnormal nozzle detection region 260b for detecting the nozzle from which the ultraviolet curing resin is not ejected in the multiple nozzles provided in inkjet head 88. Abnormal nozzle detection region 260b is an example of a "first abnormal nozzle detection region".

Inkjet head 76 includes multiple nozzles, and calibration jig 200 includes abnormal nozzle detection region 270b for detecting the nozzle from which the metal ink is not ejected in the multiple nozzles provided in inkjet head 76. Abnormal nozzle detection region 270b is an example of a "second abnormal nozzle detection region".

Three-dimensional laminate shaping device 10 includes camera 120 that images an upper side of the board, and the multiple types of calibration marks include a camera tilt measurement mark for measuring the tilt of camera 120. Camera tilt calibration mark 210 is an example of a "camera tilt measurement mark".

The multiple types of calibration marks include camera calibration mark 220. Camera calibration mark 220 is an example of a "calibration mark for a camera".

The multiple types of calibration marks include jig tilt calibration mark 230 for measuring the tilt of calibration jig 200. In this manner, even when calibration jig 200 is tilted due to an operation of three-dimensional laminate shaping device 10, the tilt can be corrected based on the tilt of calibration jig 200 measured using jig tilt calibration mark 230. Jig tilt calibration mark 230 is an example of a "jig tilt measurement mark".

In addition, two or more types of some calibration marks in the multiple types of calibration marks are shared by the same mark. In this manner, the number of marks disposed in calibration jig 200 can be reduced. Therefore, a size of calibration jig 200 can be reduced.

In addition, calibration jig 200 is formed of glass. In this manner, expansion or compression affected by heat generated inside three-dimensional laminate shaping device 10 is less likely to occur. Therefore, accuracy of calibration is improved.

The present disclosure is not limited to the embodiments described above, and various modifications can be made within the scope not departing from the concept of the present disclosure.

(1) When various types of calibration are repeatedly performed using calibration jig 200, in some cases, there may be no longer region where calibration can be performed on calibration jig 200. However, this case is not described in the above-described embodiment. In this case, it is conceivable to adopt a method for automatically cleaning the front surface of calibration jig 200, a method for covering the front surface of calibration jig 200 with a transparent wrap, removing the wrap, and manually covering the front surface with a new wrap when there is no longer region where calibration can be performed, or a method for automatically winding the wrap and supplying a new wrap.

(2) In the above-described embodiment, various types of calibration marks have a circular shape. However, without being limited to the circular shape, a rectangular shape or a second shape may be used. However, it is preferable to use marks having the same shape instead of using marks having different shapes for each calibration. The reason is that the marks having the same shape can be shared for calibration multiple times.

(3) In the above-described embodiment, an example in which seven types of calibration marks 210, 220, 230, 240, 250, 260*a*, and 270*a* and two types of abnormal nozzle detection regions 260*b* and 270*b* are printed on the same plane has been described as calibration jig 200. However, the number of types of the calibration may increase or decrease, compared to the example. In addition, contents of the calibration are not limited to the example.

REFERENCE SIGNS LIST

10: three-dimensional laminate shaping device, 22: first shaping unit, 23: second shaping unit, 24: third shaping unit, 25: fourth shaping unit, 26: imaging unit, 72: first printing section, 76, 88: inkjet head, 84: second printing section, 106, 136: dispenser, 110: controller, 114: image processing device, 116: storage device, 120: camera, 200: calibration jig, 210: camera tilt calibration mark, 220: camera calibration mark, 230: jig tilt calibration mark, 240: conductive paste position calibration mark, 250: thermosetting resin calibration mark, 260: first calibration region, 260*a*: ultraviolet curing resin position calibration mark, 260*b*, 270*b*: abnormal nozzle detection region, 270: second calibration region, 270*a*: metal ink position calibration mark, 280: third calibration region.

The invention claimed is:

1. A three-dimensional laminate shaping device comprising:

a base plate movable in an X-direction and a Y-direction, an upper surface of the base plate configured to hold a circuit board via grippers that hold edges of the circuit board;

a first printing device including a first ejection head configured to eject a structural material, the first printing device being configured to laminate the structural material on the circuit board by discharging the structural material from the first ejection head;

a jig fixed on the upper surface of the base plate outside of a position of the circuit board held by the grippers, the jig including multiple types of calibration marks printed on a same surface of the jig, the multiple types of calibration marks including a first aligning mark;

a camera configured to image the jig and an upper side of the circuit board; and a control device configured to move the first ejection head to correspond to the first aligning mark, instruct the first ejection head to eject a dot of the structural material on the jig, instruct the camera to image a first calibration region including the dot and the first aligning mark, measure a deviation amount of the dot and the first aligning mark based on the image, and perform a calibration for aligning a first printing position of the first ejection head based on the deviation amount.

2. The three-dimensional laminate shaping device according to claim 1, further comprising:

a second printing device including a second ejection head configured to eject metal ink, the second printing device configured to print a circuit material on the circuit board by ejecting the metal ink from the second ejection head, wherein the multiple types of calibration marks include a second aligning mark, and the control device is further configured to perform a calibration for aligning a second printing position of the second ejection head based on a second image of the second alignment mark.

3. The three-dimensional laminate shaping device according to claim 1, further comprising:

a first supply device configured to supply a first conductive adhesive onto the circuit board, wherein the multiple types of calibration marks include a third aligning mark, and the control device is further configured to perform a calibration for aligning a supply position of the first supply device based on a third image of the third alignment mark.

4. The three-dimensional laminate shaping device according to claim 1, further comprising:

a second supply device configured to supply a non-conductive adhesive onto the circuit board, wherein the multiple types of calibration marks include a fourth aligning mark, and the control device is further configured to perform a calibration for aligning a supply position of the second supply device based on a fourth image of the fourth alignment mark.

5. The three-dimensional laminate shaping device according to claim 1, wherein the first ejection head includes multiple nozzles, and the jig includes a first abnormal nozzle detection region, and the control device is further configured to detect a nozzle from which the structural material is not ejected in the multiple nozzles provided in the first ejection head based on an image of the first abnormal nozzle detection region.

6. The three-dimensional laminate shaping device according to claim 2, wherein the second ejection head includes multiple nozzles, and the jig includes a second abnormal nozzle detection region, and the control device is further configured to detect a nozzle from which the metal ink is not ejected in the multiple nozzles provided in the second ejection head based on an image of the second abnormal nozzle detection region.

7. The three-dimensional laminate shaping device according to claim 1, wherein the multiple types of calibration marks include a calibration mark for the camera.

8. The three-dimensional laminate shaping device according to claim 1, wherein the multiple types of calibration marks include a jig tilt measurement mark for measuring tilt of the jig.

9. The three-dimensional laminate shaping device according to claim 1, wherein the jig is formed of glass.

\* \* \* \* \*